US011499677B2

United States Patent
Kanamori

(10) Patent No.: US 11,499,677 B2
(45) Date of Patent: Nov. 15, 2022

(54) GAS FILLING APPARATUS

(71) Applicant: TATSUNO CORPORATION, Tokyo (JP)

(72) Inventor: Akifumi Kanamori, Tokyo (JP)

(73) Assignee: TATSUNO CORPORATION, Tokyo (JP)

( * ) Notice: Subject to any disclaimer, the term of this patent is extended or adjusted under 35 U.S.C. 154(b) by 88 days.

(21) Appl. No.: 16/160,154

(22) PCT Filed: Apr. 22, 2016

(86) PCT No.: PCT/JP2016/062776
§ 371 (c)(1),
(2) Date: Oct. 15, 2018

(87) PCT Pub. No.: WO2017/183185
PCT Pub. Date: Oct. 26, 2017

(65) Prior Publication Data
US 2020/0332961 A1     Oct. 22, 2020

(51) Int. Cl.
F17C 5/06 (2006.01)
F17C 13/04 (2006.01)
F17C 13/08 (2006.01)

(52) U.S. Cl.
CPC ............... *F17C 5/06* (2013.01); *F17C 13/04* (2013.01); *F17C 13/084* (2013.01);
(Continued)

(58) Field of Classification Search
CPC .......... F17C 5/06; F17C 13/04; F17C 13/084; F17C 2205/0332; F17C 2205/0355;
(Continued)

(56) References Cited

U.S. PATENT DOCUMENTS 9,528,657 B2 * 12/2016 Allidieres ............... F17C 5/007
2010/0006256 A1 * 1/2010 Kuwano ............... F28D 7/1607
165/47
(Continued)

FOREIGN PATENT DOCUMENTS

EP      2799757 A1    11/2014
JP    2010121657 A     6/2010
(Continued)

OTHER PUBLICATIONS

JP2014109350A—English translation (Year: 2012).*
Supplemental European Search Report for EP16899457; dated Nov. 12, 2019.

*Primary Examiner* — Timothy P. Kelly
*Assistant Examiner* — Christopher M Afful
(74) *Attorney, Agent, or Firm* — Stetina Brunda Garred and Brucker; Mark B. Garred

(57) ABSTRACT

A gas filling apparatus with excellent filling efficiency through a downsized gas pipe cooling section. A gas filling apparatus 1 of the present disclosure includes; a main unit 2 having a filling mechanism for transporting a gas from a gas supply source through a primary pipe 71 while measuring a flow rate of the gas and a gas pipe cooling section 41 for cooling a gas pipe in which a gas from the filling mechanism is introduced; and a hose unit 3 having a filling hose 34 connected to a secondary pipe 72 lead from the gas pipe cooling section and a gas filling nozzle attached to an end of the filling hose, wherein the gas pipe cooling section is made of copper alloy. The pipe cooling section can be disposed at a connecting portion between the secondary pipe and the filling hose, and plurality of the filling mechanisms can be mounted, and to each filling mechanism is independently mounted the gas pipe cooling section. The gas pipe cooling section can be accommodated in a vessel 42 with vacuum insulation structure, and to the vessel is connected a pipe 44

(Continued)

for communicating a vacuum portion 42*a* of the vessel with a diffusion pipe through a safety valve 43.

15 Claims, 4 Drawing Sheets

(52) U.S. Cl.
CPC .............. *F17C 2205/0332* (2013.01); *F17C 2205/0355* (2013.01); *F17C 2205/0364* (2013.01); *F17C 2221/012* (2013.01); *F17C 2221/033* (2013.01); *F17C 2223/0123* (2013.01); *F17C 2223/036* (2013.01); *F17C 2225/0123* (2013.01); *F17C 2225/036* (2013.01); *F17C 2227/0337* (2013.01); *F17C 2250/043* (2013.01); *F17C 2250/0439* (2013.01); *F17C 2250/0443* (2013.01); *F17C 2260/038* (2013.01); *F17C 2265/065* (2013.01); *F17C 2270/0178* (2013.01)

(58) Field of Classification Search
CPC ........ F17C 2205/0364; F17C 2221/012; F17C 2221/033; F17C 2223/0123; F17C 2223/036; F17C 2225/0123; F17C 2225/036; F17C 2227/0337; F17C 2250/043; F17C 2250/0439; F17C 2250/0443; F17C 2260/038; F17C 2265/065; F17C 2270/0178
See application file for complete search history.

(56) References Cited

U.S. PATENT DOCUMENTS

| | | | |
|---|---|---|---|
| 2012/0125480 A1* | 5/2012 | Inagi | ................. F17C 5/06 141/82 |
| 2014/0102587 A1* | 4/2014 | Nagura | ................. B60L 58/40 141/69 |
| 2015/0184804 A1 | 7/2015 | Handa | |
| 2015/0292807 A1* | 10/2015 | Romeo | ............... F28D 15/0275 165/104.21 |

FOREIGN PATENT DOCUMENTS

| | | | | |
|---|---|---|---|---|
| JP | 2014109350 A | * | 6/2014 | ............. F17C 5/007 |
| JP | 2014109350 A | | 6/2014 | |
| WO | 2008075509 A1 | | 6/2008 | |
| WO | 2011012939 A1 | | 2/2011 | |

\* cited by examiner

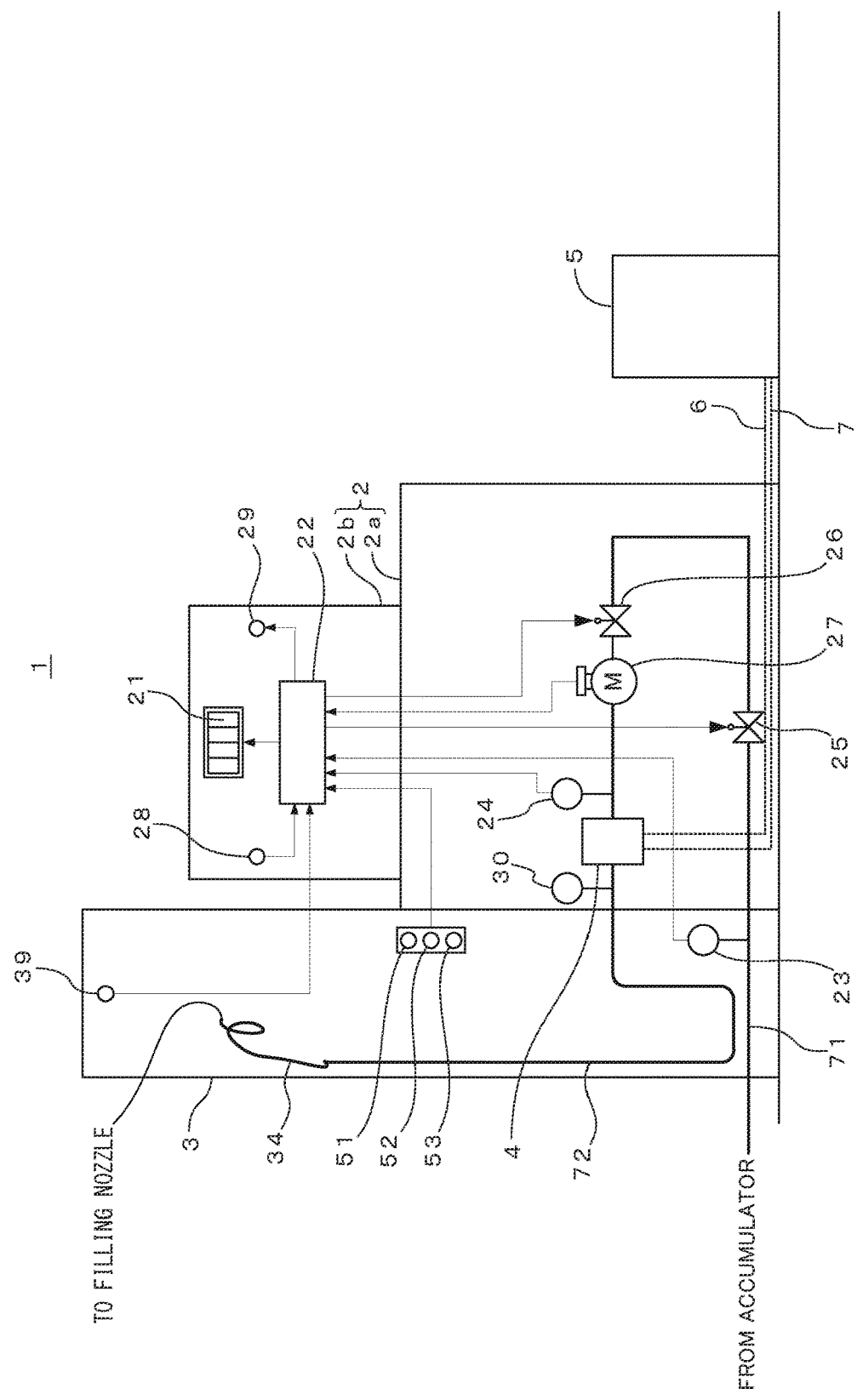
[Fig. 1]

[Fig. 2]
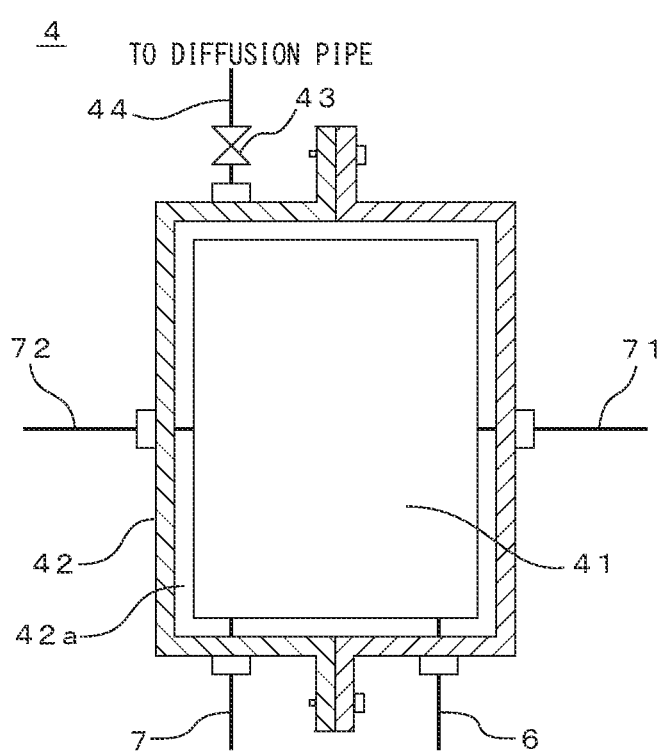

[Fig. 3]
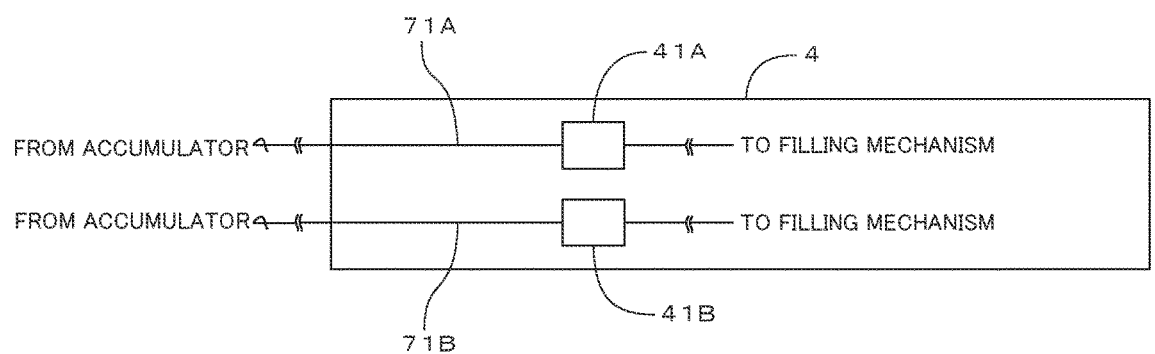

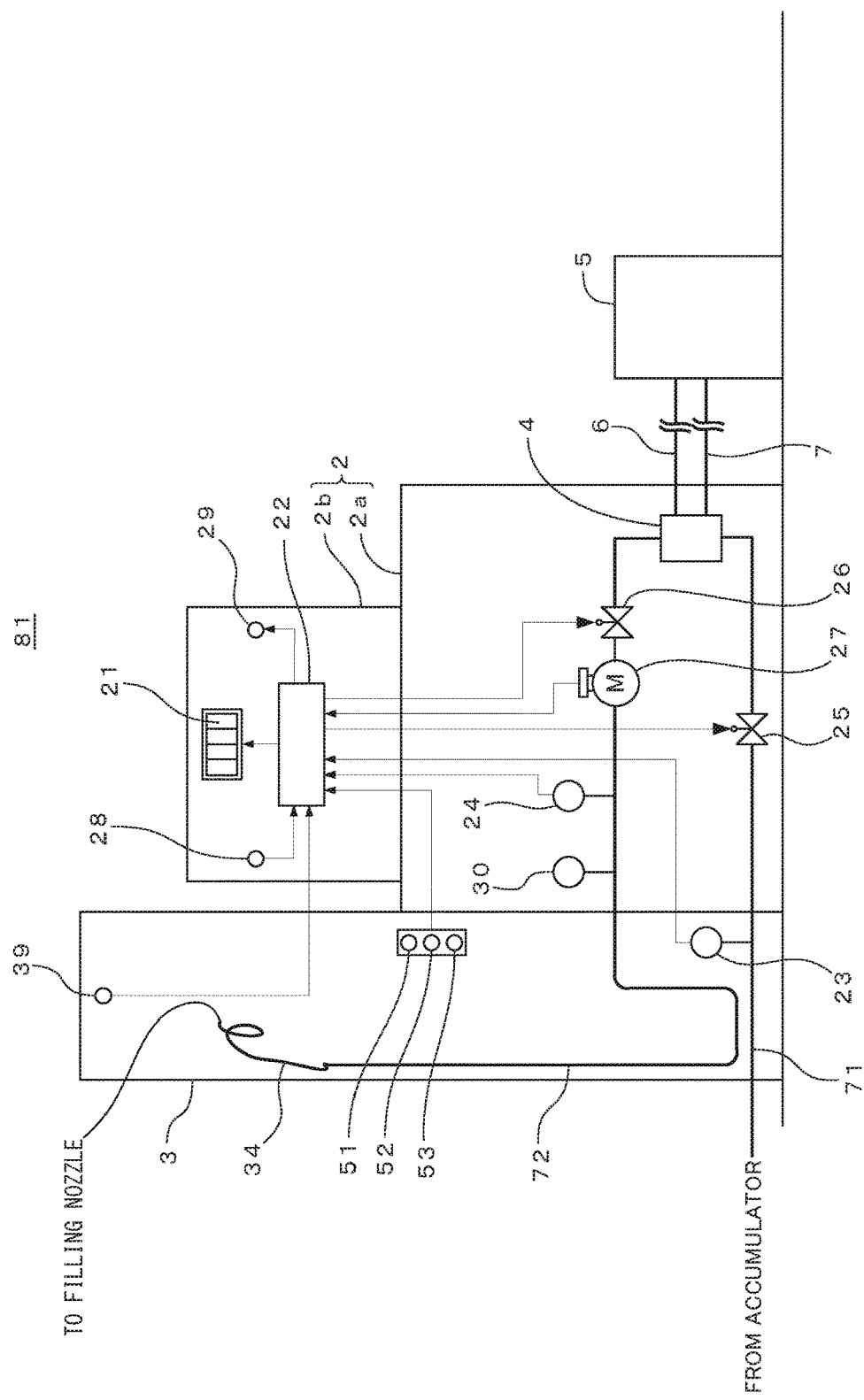

GAS FILLING APPARATUS

CROSS-REFERENCE TO RELATED APPLICATIONS

The present application claims priority to International Application No. PCT/JP2016/062776 filed on Apr. 22, 2016, the disclosure of which is incorporated herein by reference.

STATEMENT RE: FEDERALLY SPONSORED RESEARCH/DEVELOPMENT

Not Applicable

BACKGROUND

1. Technical Field

The present disclosure relates to a gas filling apparatus for filling a gas into a fuel tank mounted on a vehicle such as a CNG vehicle, a fuel-cell-powered vehicle, a hydrogen vehicle and the like that use CNG, hydrogen gas and so on for fuel.

2. Description of the Related Art

As vehicles have attempted to cope with recent environmental problems, developments regarding CNG vehicles, fuel-cell-powered vehicles, hydrogen vehicles and the like that use CNG, hydrogen gas and so on for fuel have been advanced.

In Patent document 1 (e.g., Japanese Patent Publication 2012-265125 gazette) for instance, there is proposed a technique for filling a gas while suppressing temperature increase in a fuel tank in a vehicle by cooling the gas fed to the fuel tank through a gas cooling facility.

BRIEF SUMMARY

Although the invention described in the above patent document 1 is effective, in this gas filling apparatus, for a gas pipe cooling section (a heat exchanger) for cooling gas pipes in which a gas is fed from an accumulator as a gas supply source through a filling mechanism stainless steel is used and which may have excellent corrosion and rust resistances.

However, since stainless steel is excellent in heat retaining property but inferior in thermal conductivity, and the gas pipe cooling section itself becomes large in consideration of strength of the stainless steel, there is a possibility that freedom of device layout is impeded.

Then, the subject of the present disclosure has been made in consideration of the above problems in the conventional gas filling apparatus, and an object of the present disclosure is to provide a gas filling apparatus with excellent filling efficiency through downsized gas pipe cooling section.

In order to attain the above object, the present disclosure relates to a gas filling apparatus, and the gas filling apparatus is characterized by including; a main unit having a filling mechanism for transporting a gas from a gas supply source through a primary pipe while measuring a flow rate of the gas and a gas pipe cooling section for cooling a gas pipe in which a gas from the filling mechanism is introduced; and a hose unit having a filling hose connected to a secondary pipe lead from the gas pipe cooling section and a gas filling nozzle attached to an end of the filling hose, wherein the gas pipe cooling section is made of copper alloy.

The copper alloy may include beryllium copper alloys, copper-titanium alloys and so on. Copper alloys are excellent in thermal conductivity, so that the gas pipe cooling section can be downsized, and a coolant cooling section can be downsized also, which achieve energy saving.

In addition, when the gas filling apparatus of the present disclosure is used for feeding hydrogen to hydrogen gas vehicles, copper alloys are strong against hydrogen embrittlement and excellent in thermal conductivity and mechanical strength, which contributes efficient hydrogen filling.

In the above gas filling apparatus, the gas pipe cooling section may be disposed at a connecting portion between the secondary pipe and the filling hose. With this, the distance from the secondary pipe to a vehicle becomes short, so that cooling effect is improved and filling time can be shortened. Further, a gas cooled in the gas pipe cooling section is instantaneously introduced to the filling hose, which may discourage covering of the pipe with insulating material, resulting in reduced production cost also.

It is possible to incorporate a plurality of the filling mechanisms, and to each filling mechanism can be independently mounted to the gas pipe cooling section. With this, when plurality of the filling mechanisms are simultaneously operated to fill the gas, cooling efficiency can be improved and filling velocity can be enhanced.

In the above gas filling apparatus, the gas pipe cooling section may be accommodated in a vessel with a vacuum insulation structure, and to the vessel is connected a pipe for communicating a vacuum portion of the vessel with a diffusion pipe through a safety valve. With this, even if a gas in the gas pipe cooling section leaks by any possibility, the gas can be safely discharged out of the apparatus.

As described above, with the present disclosure, it becomes possible to provide a gas filling apparatus with excellent filling efficiency through downsizing the gas pipe cooling section.

BRIEF DESCRIPTION OF THE DRAWINGS

FIG. 1 is an entire constitution view of a gas filling apparatus according to the first embodiment of the present disclosure.

FIG. 2 is a cross sectional view of a cooling section of the gas filling apparatus shown in FIG. 1.

FIG. 3 is a schematic view showing a constitution of a gas filling apparatus according to the second embodiment of the present disclosure, in which plurality of filling mechanisms are mounted to the gas filling apparatus shown in FIG. 1, and to each filling mechanism is independently mounted a gas pipe cooling section.

FIG. 4 is an entire constitution view of a gas filling apparatus according to the third embodiment of the present disclosure.

DETAILED DESCRIPTION

Next, embodiments of the present disclosure will be explained with referenced to the drawings in detail. In the below explanation, the gas filling apparatus of the present disclosure is a hydrogen gas filling apparatus as an example, and with the apparatus, a hydrogen gas may be fed to a hydrogen gas vehicle.

FIG. 1 shows a hydrogen gas filling apparatus according to the first embodiment of the present disclosure, and the hydrogen gas filling apparatus 1 is composed of a main body unit 2, a hose unit 3, a cooling section 4 disposed in the main body unit 2, a coolant cooling section 5 separately arranged from the main body unit 2 and the hose unit 3, and others. The main body unit 2 and the hose unit 3 are integrally formed with each other, and the coolant cooling section 5 is connected to the cooling section 4 through coolant transporting pipes 6, 7.

The main body unit 2 is composed of a filling section 2a for transporting a hydrogen gas (hereinafter referred to as "gas") from an accumulator not shown as a hydrogen gas source while measuring a flow rate of the gas, and a display section 2b mounted on a ceiling portion of the filling section 2a to display filling amount of the gas and so on.

The filling section 2a is provided with a flow control valve 25 for controlling a flow rate of the gases flowing in a gas pipe 71 (primary pipe) and a gas pipe 72 (secondary pipe) from the accumulator, a shut off valve 26 for shutting the gas, a flow meter 27 for measuring a flow rate of the gas, and others.

The display section 2b is provided with a display 21 for displaying a flow rate of the gases flowing in the gas pipes 71, 72 (quantity of gas supply from a filling nozzle not shown to a fuel tank in an hydrogen gas vehicle (hereinafter referred to as "vehicle") and so on), a gas detector 28 for detecting leakage of the gas, an alarm 29 for raising an alarm, and a controller 22 for controlling the entire whole apparatus.

To the controller 22 are connected various operation switches, and are inputted ON/OFF signals from a nozzle switch not shown mounted on a nozzle hook of a filling nozzle, signals from a pulse generator not shown of the flow meter 27, and control signals are outputted from the flow control valve 25 to the flow meter 27 and others.

The hose unit 3 is provided with a filling hose 34 connected to the gas pipe 72, pressure gages 23, 24 for detecting pressures in the pipes 71, 72, a thermometer 30 for measuring temperature of the gas flowing in the gas pipe 72, a gas detector 39 for detecting gas leakage, a start switch 51 for starting gas supply to an automobile, a stop switch 52 for stopping gas supply, an emergency stop switch 53 for stopping gas supply when an abnormality occurs, and so on.

The cooling section 4 is, as shown in FIG. 2, provided with a gas pipe cooling section 41 for cooling the gas pipe 71, and the gas pipe cooling section 41 cools the gas flowing in the gas pipe 71 with the coolant fed from the coolant cooling section 5 through the coolant transporting pipes 6, 7. As the coolant can be used liquid nitrogen, Freon, carbon dioxide and others, and the coolant is cyclically used through cooling in the coolant cooling section 5. The gas pipe cooling section 41 is accommodated in a vessel 42 with a vacuum insulation structure, and a pipe 44 is connected to the vessel 42 for communicating a vacuum portion 42a of the vessel 42 with a diffusion pipe not shown through a safety valve 43.

The above gas pipe cooling section 41 is made of copper alloy such as beryllium copper alloy and copper-titanium alloy. Table 1 shows physical properties of stainless steel (SUS316L) that is conventionally used for a gas pipe cooling section and beryllium copper alloy (CuBe-HT) to compare those materials with each other. The beryllium copper alloy is three times stronger in tensile strength and five to eight times larger in thermal conductivity than the stainless steel, therefore, using copper alloys allows the gas pipe cooling section 41 to be downsized, further the coolant cooling section 5 can also be downsized, which achieves energy saving. In addition, copper alloys are strong against hydrogen embrittlement, so that they are preferably used for hydrogen gas filling apparatuses.

TABLE 1

| Items (room temperature) | SUS316L | CuBe-HT |
|---|---|---|
| Young's modulus [GPa] | 193 | 127 |
| Tensile strength [MPa] | 564-611 | 1.402 |
| Density [g/cm$^3$] | 7.98 | 8.26 |
| Thermal conductivity [W/(m · K)] | 16.3 (100° C.) | 83.7-130 |

Next, motion of the hydrogen gas filling apparatus 1 with the above construction will be explained with reference to FIGS. 1 and 2.

When the gas is supplied to an automobile, detaching the filling nozzle from the nozzle hook causes an ON signal is inputted from the nozzle switch mounted on the nozzle hook to the controller 22, and the controller 22 resets the last filling amount displayed on the display 21 to zero and opens the shut off valve 26.

Next, the filling nozzle, having been detached from the nozzle hook, is inserted into a filling spout of the fuel tank of the automobile, and pulling a filling lever of the filling nozzle allows a high pressure gas from the accumulator to be filled into the fuel tank of the automobile through the gas pipe 71, the flow control valve 25, the shut off valve 26, the flow meter 27, the cooling section 4, the gas pipe 72 and the filling hose 34. At this moment, the controller 22 counts flow rate signals from the flow meter 27 to display a filling amount on the display 21.

Hanging the filling nozzle on the nozzle hook, after filling to the automobile is finished, causes an OFF signal to be sent from the nozzle switch to the controller 22, and the controller 22 shuts the flow control valve 25 and the shut off valve 26 to enable payment based on the filling amount displayed on the display 21.

When gas stays in the display section 2b or the hose unit 3 during gas filling to the automobile and the gas is detected by the gas detector 28 or the gas detector 39, the alarm 29 generates an alert due to the gas leakage, the shut off valve 26 is shut and others urged to deal with the gas leakage.

In addition, when an abnormality in inner pressure of the gas pipe 71 is detected by the pressure gages 23, 24 during gas filling to the automobile, the alarm 29 may generate an alert due to the abnormality, the shut off valve 26 is shut and others may be urged to deal with the abnormality. Further, when other abnormalities occur, pressing the emergency stop switch 53 enables the supply of the gas to stop.

Furthermore, when temperature of the gas flowing in the gas pipe 72 measured by the thermometer 30 does not reach to a setting temperature (−40° C. to −35° C.) as may be needed to facilitate filling, filling operation stops.

In addition, even when a gas in the gas pipe cooling section 41 leaks, the gas leaked to the vacuum portion 42a of the vessel 42 can be released to the diffusion pipe from the safety valve 43.

Meanwhile, in the above embodiment, it is explained that the coolant cooling section 5 and the gas pipe cooling section 41 are in one-to-one relation, but the coolant cooling section 5 can be connected to a plurality of gas pipe cooling sections 41.

Further, in the above embodiment, since the gas pipe cooling section 41 is disposed on a downstream side from the flow meter 27 and the pressure gage 24, it is sufficient to cover, with an insulating material, the gas pipe 72 only, which is positioned on a downstream side from the cooling section 4 in which a cooled gas flows, so that it is preferable that the gas pipe 71, positioned on an upstream side from the cooling section 4 is not required to be covered with an insulating material. In addition, mounting the gas pipe cooling section 41 at a connection portion between the gas pipe 72 and the filling hose 34 causes the distance from the gas pipe cooling section 41 to the vehicle to be shortened, which improves cooling effect to shorten filling time, and a gas cooled in the gas pipe cooling section 41 is immediately introduced to the filling hose 34, which may reduce the need to cover the pipe with insulating material to reduce production cost of the hydrogen gas filling apparatus 1.

Next, a hydrogen gas filling apparatus according to the second embodiment of the present disclosure will be explained while referring FIG. 3.

In this embodiment, two filling mechanisms are installed, and in the cooling section 4, the gas pipe cooling section 41 (41A, 41B) is independently mounted to each filling mechanism. In other words, the gases from the accumulator, which flow in the gas pipe 71 (71A, 71B), are independently cooled in the gas pipe cooling section 41 (41A, 41B), and then fed to each filling mechanism. With this, when plurality of filling mechanisms are simultaneously used to fill the gas to a vehicle or the like, cooling effect is prevented from being reduced, and filling velocity can be increased.

Next, a hydrogen gas filling apparatus according to the third embodiment of the present disclosure will be explained while referring FIG. 4.

In the hydrogen gas filling apparatus 81, in the same manner as the hydrogen filling apparatus described in the patent document 1, the cooling section 4 is mounted near the coolant cooling section 5. Other constructions of the hydrogen gas filling apparatus 81 are the same as those of the hydrogen gas filling apparatus 1 shown in FIG. 1, so that the same reference numerals are used as the hydrogen gas filling apparatus 1 and explanations thereof are omitted.

In this embodiment, the shut off valve 26 and the flow meter 27 are positioned on a downstream side from the gas pipe cooling section 41 of the cooling section 4, so that the gas pipe 72 with the shut off valve 26 and the flow meter 27 should be covered with insulating material. Using copper alloys for the gas pipe cooling section 41 can downsize the gas pipe cooling section 41, and further the coolant cooling section 5 also can be downsized, which achieve energy saving. In addition, strong against hydrogen embrittlement, copper alloys can be preferably used for the hydrogen gas filling apparatus.

Meanwhile, in the embodiment described above, copper alloys may be used for the gas pipe cooling section 41. In addition to that, copper alloys may be used for pipes connected to the gas pipe cooling section 41 and others. In such a case, since tensile strength of copper alloys is large, wall thickness of the pipes can be reduced, and making bend R (radius at a bent position, which is limited to four times larger than the pipe size) small achieves downsizing the apparatus itself.

In addition, copper alloys can be used for components such as the filling nozzle, the valves and the flow meter also. Making wall thickness of each component thinner contributes lightening and downsizing the apparatus.

Further, in the above embodiments, hydrogen gas is supplied to a hydrogen gas automobile as an example, the gas filling apparatus of the present disclosure can handle gaseous fuel such as CNC other than hydrogen.

DESCRIPTION OF THE REFERENCE NUMERALS 1 hydrogen gas filling apparatus
2 main body unit
2a filling section
2b display section
3 hose unit
4 cooling section
5 coolant cooling section
6, 7 coolant transporting pipes
21 display
22 controller
23, 24 pressure gages
25 flow control valve
26 shut off valve
27 flow meter
28 gas detector
29 alarm
30 thermometer
34 filling hose
39 gas detector
41 gas pipe cooling section
42 vessel
42a vacuum portion
43 safety valve
44 pipe
51 start switch
52 stop switch
53 emergency stop switch
71, 72 gas pipes
81 hydrogen gas filling apparatus

The invention claimed is:

1. A gas filling apparatus for transporting a gas from a gas supply source, the gas filling apparatus comprising:
   a primary pipe and a secondary pipe;
   a flow meter for measuring a flow rate of the gas flowing through at least one of the primary pipe and the secondary pipe;
   a first pressure gauge in communication with the primary pipe for measuring a pressure of the gas in the primary pipe;
   a vessel defining an inner wall, the vessel being downstream of the flow meter and the first pressure gauge;
   a gas pipe cooling section located within the vessel, the gas pipe cooling section being made of copper alloy for cooling the secondary pipe, the gas pipe cooling section and the vessel defining a vacuum portion extending between the gas pipe cooling section and the inner wall of the vessel;
   a coolant transport pipe extending between the vessel and the gas pipe cooling section through the vacuum portion to facilitate the flow of coolant to the gas pipe coolant section; and
   a first filling hose connected to the gas pipe cooling section and a gas filling nozzle attached to an end of the first filling hose.

2. The gas filling apparatus as claimed in claim 1, wherein the gas pipe cooling section includes at least two independent gas pipe inlet sections.

3. The gas filling apparatus as claimed in claim 1, further comprising a safety valve in fluid communication with the vacuum portion.

4. The gas filling apparatus as claimed in claim 3, wherein the gas pipe cooling section includes at least two independent gas pipe inlet sections.

5. The gas filling apparatus as claimed in claim 1, further comprising a display in operative communication with the flow meter for displaying information derived from the flow meter.

6. The gas filling apparatus as claimed in claim 1, further comprising a second pressure gauge in communication with at least one of the primary pipe and the secondary pipe, the flow meter being fluidly located between the first and second pressure gauges.

7. The gas filling apparatus as claimed in claim 1, further comprising a valve in communication with the primary pipe to control gas flow along the primary pipe.

8. The gas filling apparatus as claimed in claim 7, further comprising a gas detector configured to detect a gas leak, the gas detector being in operative communication with the valve to cause the valve to close in response to detecting the gas leak.

9. A gas filling apparatus for delivering gas from a gas source to a filling nozzle, the gas filling apparatus comprising:
- a primary pipe fluidly connectable to the gas source to receive gas therefrom;
- a flow meter in fluid communication with the primary pipe to measure a flow rate of gas flow within the primary pipe;
- a secondary pipe in fluid communication with the primary pipe;
- a vessel defining an inner wall, the vessel being downstream of the flow meter;
- a gas pipe cooling section in communication with the primary pipe and the secondary pipe, the gas pipe cooling section being fabricated, at least in part, from a copper alloy, the gas pipe cooling section and the vessel defining a vacuum portion extending between the gas pipe cooling section and the inner wall of the vessel; and
- a coolant cooling section in communication with the gas pipe cooling section for providing coolant thereto.

10. The gas filling apparatus recited in claim 9, further comprising a body, the flow meter, and the gas pipe cooling section being at least partially disposed in the body.

11. The gas filling apparatus recited in claim 10, wherein the coolant cooling section is located outside of the body.

12. The gas filling apparatus as claimed in claim 9, further comprising a display in operative communication with the flow meter for displaying information derived from the flow meter.

13. The gas filling apparatus as claimed in claim 9, further comprising a first pressure gauge in communication with the primary pipe and a second pressure gauge in communication with at least one of the primary pipe and the secondary pipe, the flow meter being fluidly located between the first and second pressure gauges.

14. The gas filling apparatus as claimed in claim 9, further comprising a valve in communication with the primary pipe to control gas flow along the primary pipe.

15. The gas filling apparatus as claimed in claim 14, further comprising a gas detector configured to detect a gas leak, the gas detector being in operative communication with the valve to cause the valve to close in response to detecting the gas leak.

\* \* \* \* \*